F. A. HALE.

STAND FOR MEMORANDUM CALENDARS.

APPLICATION FILED NOV. 3, 1917.

Reissued Mar. 5, 1918.

14,442.

Inventor:
Frank A. Hale
By Gleeson & Gleeson
Att'ys.

BACKETT & WILHELMS CORP. N.Y.

UNITED STATES PATENT OFFICE.

FRANK A. HALE, OF CHICAGO, ILLINOIS.

STAND FOR MEMORANDUM-CALENDARS.

14,442. Specification of Reissued Letters Patent. Reissued Mar. 5, 1918.

Original No. 1,179,093, dated April 11, 1916, Serial No. 56,256, filed October 16, 1915. Application for reissue filed November 3, 1917. Serial No. 200,199.

*To all whom it may concern:*

Be it known that I, FRANK A. HALE, a citizen of the United States, and resident of Chicago, county of Cook, and State of Illinois, have invented certain new and useful Improvements in Stands for Memorandum-Calendars, of which the following is a specification, and which are illustrated in the accompanying drawing, forming a part thereof.

The invention relates to calendars, and more particularly to those comprising a pad of separate leaves and a holder therefor providing means for filing the leaves of the pad in two positions and for guiding the leaves while being transferred from one position to the other.

The object of the invention is to provide a stand or holder for calendars of the type described, which shall be of simple and inexpensive construction, with provision for the convenient separation and assembling of its parts for the removal and replacement of the calendar pad.

In the accompanying drawings,—

Figure 1:
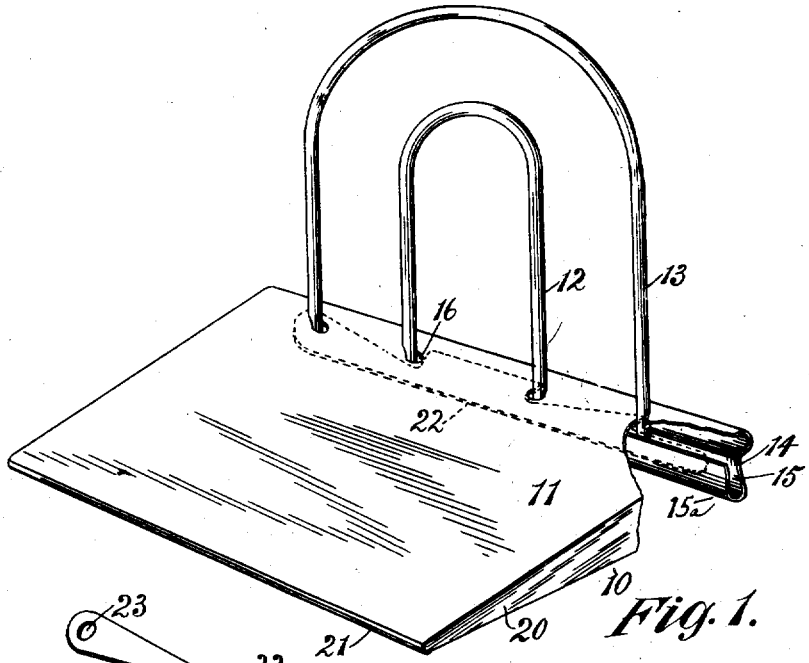
Figure 1 is a perspective view, partly broken away, showing a stand for memorandum calendars embodying the features of improvement provided by the invention.
Figure 4:
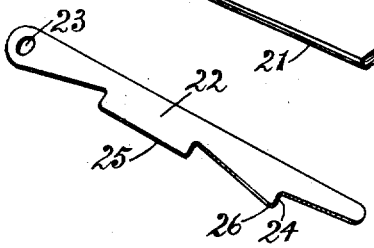
Fig. 4 is a perspective view showing a form of locking plate which may be employed for securing the filing arches to the base of the stand.
Figure 2:
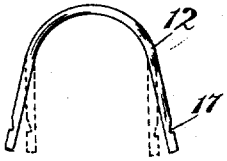
Fig. 2 shows one of the filing arches of the stand separated from other parts.
Figure 3:
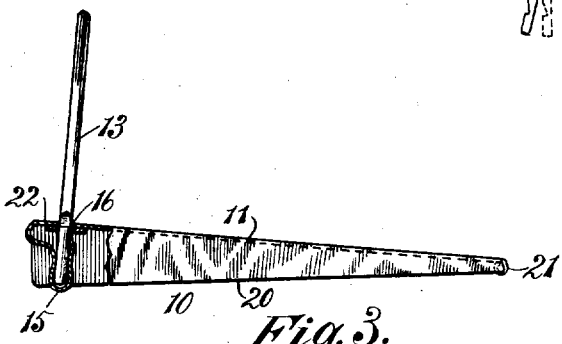
Fig. 3 is a detail end view of the stand, having a part broken away.

In carrying out the invention a base 10, preferably constructed from a sheet metal plate 11 of sufficient size to provide two seats for the leaves of the calendar pad, not shown, is employed. The filing arches, as 12 and 13, are of spring metal, as wire, and of U-shape. In the particular form of construction illustrated in the drawings, these arches are of different size, and they are arranged in a common plane.

The base has a plane face inclined upwardly from the front. At its rear edge it is provided with a depending foot-piece, the lower margin of which extends forwardly to constitute a rib for strengthening and stiffening the base as a whole, and a seat for the lower ends of the arches, the latter preferably entering the rib and being thereby more firmly stayed against movement transverse to the plane of the arches. When the base is made of sheet metal the foot-piece and rib are formed by bending the sheet downwardly and recurving it upwardly, the edge of the upturned portion being spaced apart from the inclined surface plate, thereby constituting the foot-piece 14 having at its forward side a rib 15[a], the intervening space between the rib and the foot-piece forming a channel 15 within which the ends of the arches may enter. The spacing of the upper margin of the rib 15[a] from the surface plate permits of the application to the legs of the arches of locking means when desired. Preferably, as shown, the leg 14 is offset inwardly, thereby restricting the channel 15 to the diameter of the arch wires.

The invention provides a construction which may be very inexpensively made and from but a few parts. The form of the arches 12 and 13, and the engagement of the notches 17 with the margins of the openings 16, renders the arches rigid against displacement in any direction in their own plane. Displacement of the arches in directions transverse to their plane is effectively prevented by the seating of the ends of the arches in the groove 15. On the other hand, whenever there is occasion for removal of the arches this is readily accomplished by compressing them to disengage the notches 17 from the margins of the openings 16.

A finished appearance is provided if downturned flanges, as 20, are formed at the ends of the plate 11 and the forward edge of the plate is overturned to provide a roll or bead 21. Under these circumstances the flanges 20 preferably terminate a short distance above the level of the lowest parts of the downturned portion 14 and bead 21, whereby their edges are held out of contact with the desk or table (not shown) upon which the article is to be supported, and the scratching or marring of a finished surface is avoided.

In some instances it may be desirable to provide a locking device for preventing the compression of the sides of the arches 12, 13, when the notches 17 are engaged with the margins of the openings 16. Accidental displacement of the arches is thus positively prevented. As shown, a locking plate, generally designated 22, is employed. This locking plate is located within the base 10 between the under side of the main body portion of the plate 11 and the upturned free edge of the folded portion 14. The simplest form of construction is provided if the locking plate 22 is made to swing upon one of the sides of the arch 13, as a pivot. To this end the locking plate 22 is provided with an aperture 23 near one end in order that one of the sides of the arch 13 may pass through it. The locking plate is also provided with lateral projections 24 and 25, one for engaging the other side of the arch 13 upon the inside and the other for entering the space between the two sides of the arch 12. The projection 24 is provided with a rounded nose 26, which is required to be forced by the said other side of the arch 13 in swinging the locking plate between its open and closed positions.

I claim as my invention—

1. A holder for pad calendars comprising, in combination, a sheet metal base plate having a row of apertures extending along the same adjacent one edge, that part of the plate beyond the row of apertures being folded downwardly and then inwardly and upwardly to provide an upwardly facing groove below the body of the plate in line with the row of apertures, and a pair of filing arches of unequal span each having both its ends extended through apertures of the plate and seated in the said groove.

2. A holder for pad calendars comprising, in combination, a sheet metal base plate having a row of apertures extending along the same adjacent one edge, that part of the plate beyond the row of apertures being folded downwardly and then inwardly and upwardly to provide an upwardly facing groove below the body of the plate in line with the row of apertures, and a pair of elastic filing arches of unequal span each arch being notched upon the outside adjacent both its ends and both ends of each arch being extended through apertures of the plate and seated in the said groove, each notch being engaged with the plate at the margin of the corresponding aperture.

3. In a holder for pad calendars, in combination, a sheet metal base plate having a pair of apertures arranged in a line parallel to and adjacent one edge of the plate, that part of the plate beyond the apertures being folded downwardly and then inwardly and upwardly to provide an upwardly facing groove below the plate in line with its apertures, and a filing wire elastically bent to form an arch equal in width to the spacing of the apertures and notched upon the outside of the arch adjacent both ends, the ends of the wire being passed through the apertures of the plate and seated in the said groove, and its two notches being each engaged with the plate at the outer margin of the corresponding aperture.

4. In a holder for pad calendars, in combination, a sheet metal base plate having a pair of apertures arranged in a line parallel to and adjacent one edge of the plate, that part of the plate beyond the apertures being folded downwardly and then inwardly and upwardly to provide an upwardly facing groove below the plate in line with its apertures, a filing wire elastically bent to form an arch equal in width to the spacing of the apertures and notched upon the outside of the arch adjacent both ends, the ends of the wire being passed through the apertures of the plate and seated in the said groove, its two notches being each engaged with the plate at the outer margin of the corresponding aperture, and a locking plate swingingly mounted upon one side of the arch and forcibly engaging the other side of the arch upon the inside.

5. A looseleaf holder comprising, in combination, a base plate having an inclined upper surface provided with a series of apertures arranged in a line parallel to its upper margin; and having a strengthening rib below its upper marginal portion, such rib being spaced along one of its margins from the body of the plate, a filing arch having its ends entered through such apertures in the plate and engaged with the rib, and a fastening device engaging the arch between the base plate and the rib.

6. A holder for pad calendars comprising, in combination, a base plate having apertures extending through the same, a socketed supporting and strengthening rib extending under the base plate in line with its said apertures, a part of the rib at one side of its socket being spaced apart from the under side of the base plate, a filing arch having its ends extended through the apertures of the base plate and seated in the rib socket below the plate, and a fastening device removably engaged with the arch between the base plate and the rib through the opening provided by the separation of the said part of the rib from the under side of the base plate.

FRANK A. HALE.

Copies of this patent may be obtained for five cents each, by addressing the "Commissioner of Patents, Washington, D. C."